US012780568B1

(12) United States Patent
Baker et al.

(10) Patent No.: US 12,780,568 B1
(45) Date of Patent: Nov. 3, 2026

(54) STABLE ATTRACTIVE MAGNETIC MOBILITY SYSTEM USING ACTUATED PERMANENT MAGNETS

(71) Applicant: US Positronix Inc., Oberlin, OH (US)

(72) Inventors: John M. Baker, Hayward, CA (US); Remigio Perales, Oberlin, OH (US)

(73) Assignees: US Positronix Inc., Oberlin, OH (US); SRI International, Menlo Park, CA (US)

( * ) Notice: Subject to any disclaimer, the term of this patent is extended or adjusted under 35 U.S.C. 154(b) by 197 days.

(21) Appl. No.: 18/896,855

(22) Filed: Sep. 25, 2024

Related U.S. Application Data

(60) Provisional application No. 63/584,900, filed on Sep. 25, 2023.

(51) Int. Cl.
*B65G 54/02* (2006.01)
*B61B 13/08* (2006.01)

(52) U.S. Cl.
CPC .............. *B65G 54/02* (2013.01); *B61B 13/08* (2013.01)

(58) Field of Classification Search
None
See application file for complete search history.

(56) References Cited

U.S. PATENT DOCUMENTS

| | | | | |
|---|---|---|---|---|
| 10,008,915 | B2 * | 6/2018 | Lu | H02K 1/26 |
| 10,348,177 | B2 * | 7/2019 | Lu | H02K 41/031 |
| 11,437,902 | B2 * | 9/2022 | Brinkmann | B65G 54/02 |
| 2015/0097498 | A1 * | 4/2015 | Hemati | G03F 7/70725 318/135 |
| 2018/0210001 | A1 * | 7/2018 | Reza | B01L 9/06 |
| 2019/0097515 | A1 * | 3/2019 | Ota | B65G 54/02 |
| 2019/0348898 | A1 * | 11/2019 | Frangen | H02K 41/033 |
| 2021/0242765 | A1 * | 8/2021 | Suzuki | H02K 11/21 |
| 2023/0286552 | A1 * | 9/2023 | Baker | A63B 22/0214 |
| 2024/0043229 | A1 | 2/2024 | Baker et al. | |

FOREIGN PATENT DOCUMENTS

WO WO-2018208658 A1 * 11/2018 ............... G01G 7/02

* cited by examiner

*Primary Examiner* — Gene O Crawford
*Assistant Examiner* — Muhammad Awais
(74) *Attorney, Agent, or Firm* — Kathryn Perales

(57) ABSTRACT

An attractive magnetic movement system uses groups of laterally stationary under-floor magnets to create an attractive potential well which magnetically attracts and pulls a mover towards the well. The under-floor magnets adjust their strength through actuations or currents to move the attractive potential well and pull the mover. A potential attractive well can be created and moved using normally-attractive magnet orientations and alternatively with normally-repulsive magnet orientations.

23 Claims, 9 Drawing Sheets

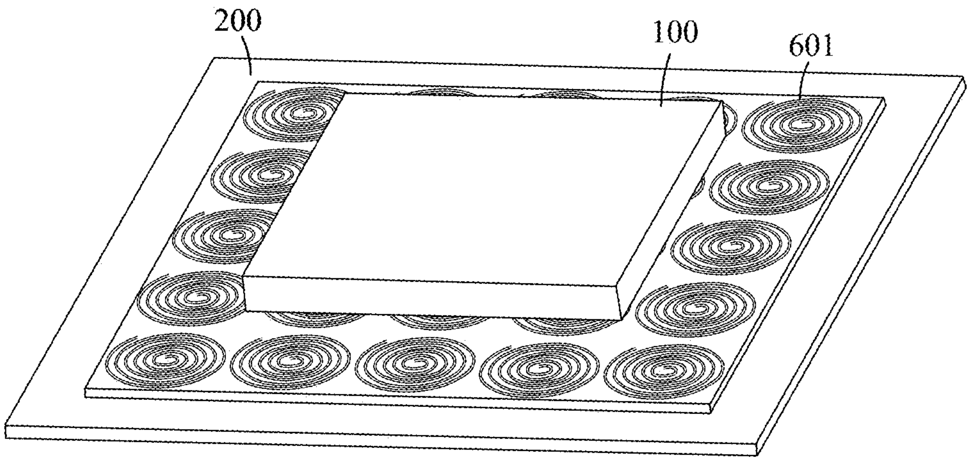
FIG. 14
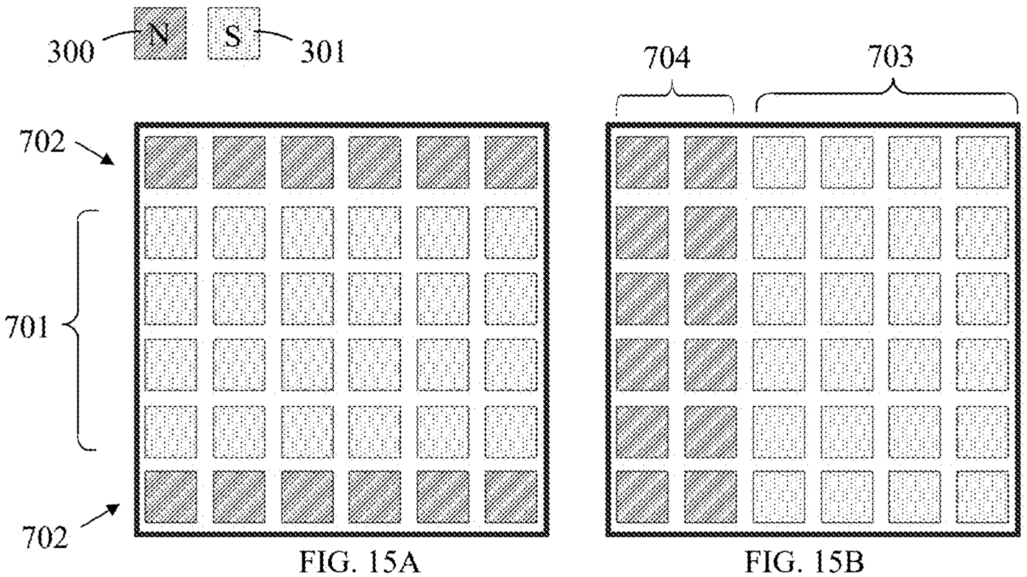
FIG. 15A
FIG. 15B
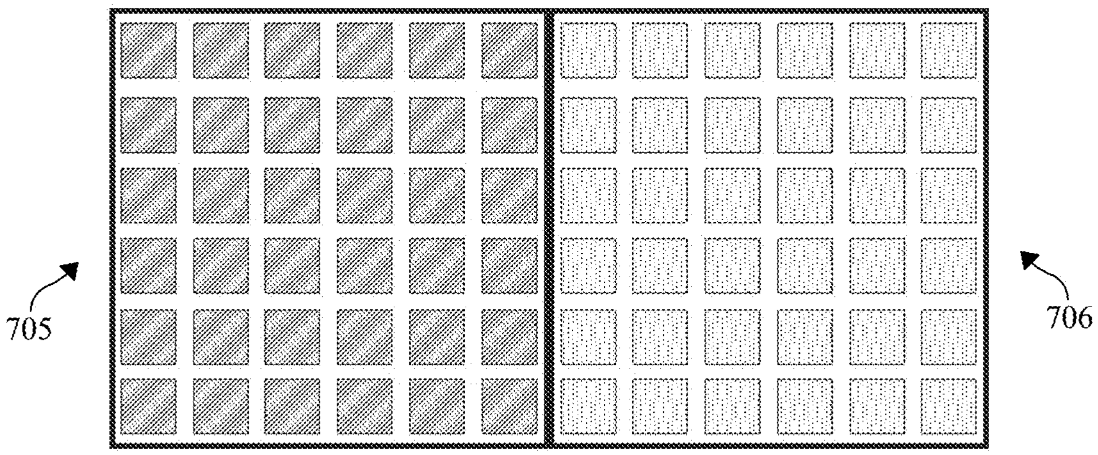
FIG. 16

STABLE ATTRACTIVE MAGNETIC MOBILITY SYSTEM USING ACTUATED PERMANENT MAGNETS

CROSS-REFERENCE TO RELATED APPLICATIONS

This application claims the benefit of U.S. Provisional Patent Application Ser. No. 63/584,900, filed on Sep. 25, 2024, having the title "Stable Attractive Magnetic Mobility System Using Actuated Permanent Magnets", the disclosure of which is hereby incorporated herein by reference.

FIELD OF THE INVENTION

Aspects herein relate generally, to stable attractive magnetic mobility systems that utilize actuated permanent magnets. Aspects further relate to systems that utilize a magnetic force produced by an interaction between at least one unit cell and a configuration space unit to perform at least one attractive operation that affects a position of the configuration space unit within the configuration space.

DESCRIPTION OF THE RELATED ART

Magnetic levitation and movement systems exist that use repulsive magnetic force to lift, suspend and move heavy loads. However, such systems require large amounts of power to perform these tasks. Moreover, such systems generate significant amounts of heat, which result in inefficiencies and excessive wear on the movement system hardware. Systems that levitate objects as heavy as trains may also require physical constraints, such as rails to achieve stability and keep the levitated objects in a proper position in relation to the magnets causing levitation. When physical restraints are not present, rapid magnetic field adjustments are necessary to stabilize levitated objects.

BRIEF SUMMARY

Aspects herein relate to a system comprising a work surface, a configuration space unit, a magnetic movement system, and an electromagnetic coil. The work surface has a configuration space associated therewith. The configuration space unit has a conveyance system and at least one of a magnet or ferrous material on a bottom thereof. Moreover, the configuration space unit is positionable within the associated configuration space of the work surface. The magnetic movement system has unit cells arranged in cooperation with the work surface. Here, each unit cell comprises at least one of a first actuator or a second actuator. The first actuator comprises a magnet coupled thereto, such that the first actuator causes movement of the magnet defining an actuated magnet. Similarly, the second actuator comprises ferrous material coupled thereto, such that the second actuator causes movement of the ferrous material. In this regard, the magnetic movement system is configured such that a magnetic force produced by an interaction between at least one unit cell and a configuration space unit performs at least one attractive operation that affects a position of the configuration space unit within the configuration space of the work surface. Multiple unit cells can be grouped into a magnetic movement system module, which can in turn have a conveyance system.

BRIEF DESCRIPTION OF THE SEVERAL VIEWS OF THE DRAWINGS

FIGS. 2A, 2B and 2C illustrate the graphs in FIGS. 3A and 3B.

FIG. 14 is an isometric view from the top and side of an array of electromagnets with a mover above.

FIG. 15A is a bottom view of a mover, showing an exemplary arrangement of magnets, with mover magnets arranged in an attractive configuration (in relation to the actuated magnets) arranged along two sides, and mover magnets arranged in a repulsive configuration (in relation to the actuated magnets) covering the remainder of the mover.

FIG. 15B is a bottom view of a mover, showing an exemplary arrangement of magnets, with mover magnets arranged in an attractive configuration (in relation to the actuated magnets) covering a left portion of the mover, and mover magnets arranged in a repulsive configuration (in relation to the actuated magnets) covering the remaining right portion of the mover.

FIG. 16 is a bottom view of two movers, one covered with mover magnets arranged in an attractive configuration (in relation to the actuated magnets) and the other covered with mover magnets arranged in a repulsive configuration (in relation to the actuated magnets), and both movers laterally combined into one larger functional mover.

DETAILED DESCRIPTION

Introduction

Figure 1:
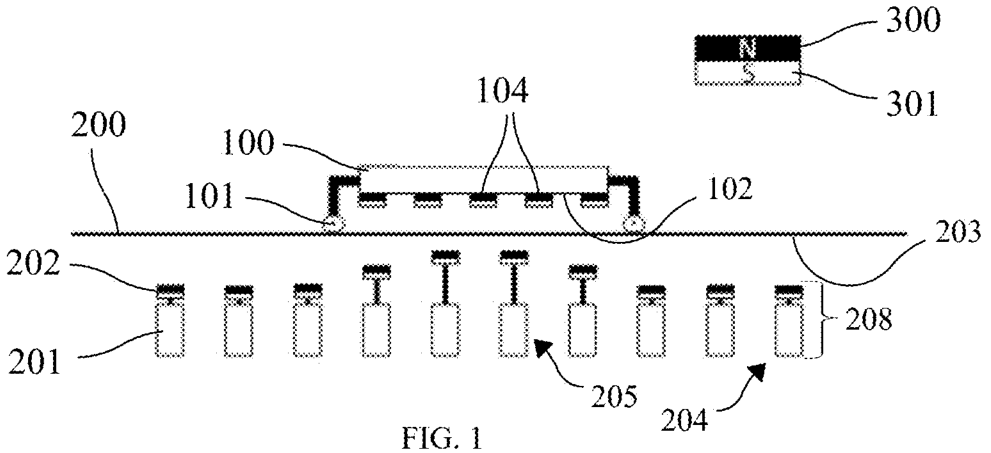
FIG. 1 is a side view of a wheeled mover on a false floor, with actuated magnets and mover magnets in a normally-attractive orientation.

By way of brief introduction, aspects herein are directed to an attractive magnetic mobility system in which a load is transported laterally over a surface using magnetic attraction. In this architecture, a load is placed on top of a mover with wheels, which in turn rests on a false floor. Underneath the false floor are permanent magnets attached to actuators. The actuators are aligned such that they move the permanent magnets towards and away from the false floor. Permanent magnets are also attached to the underside of the wheeled mover. The system is designed such that there is a net attraction through the false floor between the actuated magnets under the false floor and the magnets under the mover.

In an example implementation, a group of actuated magnets is lifted up to approach closer to the mover magnets, thus increasing attraction forces between the actuated magnets and the mover magnets, and as a result the mover is laterally pulled or dragged towards the position of the group of actuated magnets. The group of lifted actuated magnets creates a position on the false floor where the mover is most stable, a potential "attractive" well.

By adjusting the vertical positions of the actuated magnets under the floor, the position of the well changes. Assuming the new well position is close enough for magnetic forces between actuated magnets and mover magnets to interact, the mover magnets are attracted towards the new position of the well, and the mover shifts position laterally towards the new position of the well.

This drag-along system contrasts with the push-along system implemented with repulsive forces. Whereas the drag-along system attracts a mover to a moving or stationary magnetic potential well, a push-along system creates a magnetic potential hill, balancing a mover on the moving or stationary potential hill, and continually adjusting to maintain the mover's position and stability on the potential hill.

A mover can be dragged by the stable attractive magnetic mobility system in a number of ways. Mover magnets and under-floor actuated magnets can be configured to attract one another, with north polarity facing south polarity, which is referred to herein as a normally-attractive orientation. When a group of actuated magnets are lifted towards the underside of the false floor, these actuated magnets attract the mover magnets, causing the wheeled mover to shift position laterally toward the potential well caused by the magnetic interaction. To continue mover transit, some of the actuated magnets move further away from and others move closer to the false floor, causing the location of the potential well to shift in a desired direction, thus causing the mover to continue to move laterally in that direction.

Another method involves using actuated magnets and mover magnets which are configured to repel each other, for example, with the same polarity facing each other, which is referred to herein as a normally-repulsive orientation. These actuated magnets can also be raised in a configuration that creates attractive forces and a potential well, dragging a mover along towards the potential well, or parking the mover at the potential well.

Electromagnets can be used in addition to, or instead of the under-floor actuated magnets, to create and/or fine-tune a potential well. Permanent electromagnets or electropermanent magnets can also be used in the mover or under the floor.

U.S. patent application Ser. Nos. 18/007,405, 18/257,287 and 18/436,922 are incorporated by reference in their entirety, and describe a transport system, e.g., using repulsive magnetic force to levitate and push loads across a lateral surface. A system which uses repulsive force to levitate objects may utilize physical constraints, rapid adjustments of lifting forces, etc., in order to maintain stability and balance of the levitated objects, as set forth in the above, incorporated applications.

Attractive Magnetic Mobility

Referring now to the drawings, and in particular, to FIG. 1, a magnetic mobility system is provided, which requires minimal effort to maintain stability and balance. The attractive magnetic mobility system, shown in FIG. 1, allows non-powered movers 100 to move laterally through a configuration space while being supported and stabilized by a false floor 200 (e.g., a work surface). The movers 100 (e.g., configuration space units) can be supported by support structures 101, e.g., wheels, casters, ball bearings, or other low friction/low resistance structures (conveyance system). Alternatively, the movers can rest on a slippery surface like ice or a grease or oil or a soap-covered surface (also a type of conveyance system). Multiple permanent magnets 104 are attached to the underside 102 of each mover 100.

Underneath the false floor, multiple actuators 201 (e.g., linear actuators) are arranged with magnets 202 (e.g., permanent magnets) mounted on top of each (the combination being a unit cell 208). Each actuator can extend and lift its magnet 202 up towards and closer to the underside 203 of the false floor 200 and the underside 102 of a mover 100 (see extended unit cell 205), and each actuator 201 can retract and lower its magnet 202 down away from and further away from the underside of the false floor and the underside of a mover (see retracted unit cell 204).

Figure 25:
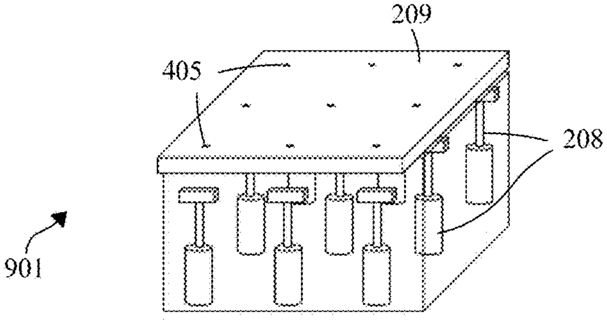
FIG. 25 shows one exemplary magnetic movement system module/modular platform with its own false floor.

The under-floor magnets 202 can be actuated and moved towards and away from the false floor 200 and movers 100 there above using alternate structures and/or methods, such as rotary actuators. Each under-floor magnet 202 can be actuated individually, or each individual actuator 201 can move multiple magnets 202. Electromagnets can be utilized in addition to, or in lieu of permanent magnets. Thus, each actuator 201 can be associated with at least one permanent magnet, at least one electromagnet, or a combination thereof. The under-floor magnets and actuators can be mounted on top of (or within) modular powered platforms (e.g., a modular magnetic movement system) which may be installed under the floor/work surface, or each modular powered platform may itself incorporate a "false floor" 209 which isolates the actuated magnets from the movers as shown in FIG. 25.

As used herein, "platform magnets" has the same meaning as "actuated under-floor magnets." The modular platforms can be stationary and permanently installed, or they can be temporarily installed in place, and can move to new locations under the floor, or may themselves move to a new location along with a piece of the "false floor".

The under-floor magnets 202 are adjusted to interact with mover magnets 104, to cause an attractive magnetic force of appropriate strength and direction to cause the mover to move in a desired way.

One way to create this attractive force is to orient the magnets on the under-floor actuators 201 such that their polarity faces an opposite pole in the mover (for example a North pole on the actuator magnets face a South pole on the mover magnets). This geometry is illustrated in FIG. 1—each magnet is shown with a black section that is a North pole 300 and a white section that is a South pole 301.

This arrangement of magnets can be opposite to that used for magnetic levitation. In magnetic levitation, the mover magnets and the actuated magnets under the false floor are aligned such that there is net repulsion between the mover magnets and the actuated magnets. These two different architectures can be thought of as creating a potential hill in the repulsive case and creating a potential well in the attractive case.

To illustrate this effect, a 2D array of actuated permanent magnets was simulated whose actuated positions were optimized to create a vertical force on the mover 100 in the Z direction when the mover 100 is centered over the actuated magnets and no lateral forces in the X or Y directions. These optimized actuations were then used in a second simulation in which the positions of the actuated magnets are fixed in the optimized positions while the center of the mover 100 is swept laterally relative to the actuated magnets. The simulation geometry is shown in FIGS. 2A, 2B and 2C.

Figures 2A, 2B, 2C:
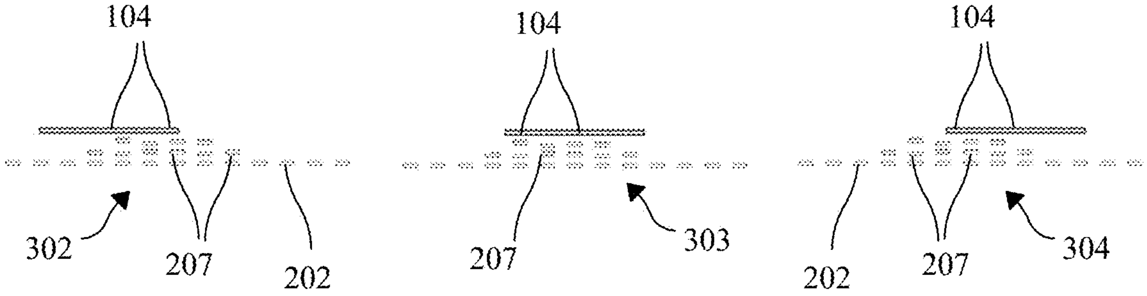
FIG. 2A is a side view of a mover (wheels not shown), shown in a first position to the left of and over a set of actuated magnets.
FIG. 2B is a side view of the mover shown in FIG. 2A, shown in a second position, closer to centered over the set of actuated magnets shown in FIG. 2A.
FIG. 2C is a side view of the mover shown in FIGS. 2A and 2B, shown in a third position to the right of and over the set of actuated magnets shown in FIGS. 2A and 2B, which is in a constant configuration.

FIGS. 2A, 2B and 2C show the position of the mover magnets 104 in three locations. The left-most example, FIG. 2A, illustrates a location of the mover magnets 104 to the left of the actuated magnet 207 distribution. The center example, FIG. 2B, illustrates a location of the mover magnets 104 at the center 303 of the distribution; and the right-most example, FIG. 2C, illustrates a location of the mover magnets 104 to the right 304 of the distribution. In the simulations, the mover is swept continuously from the left to the right of the distribution. Two simulations were run for two magnetic configurations, one in which the magnets are oriented for net attraction between the mover and actuated magnets and another where they are oriented for repulsion.

Figures 3A, 3B:
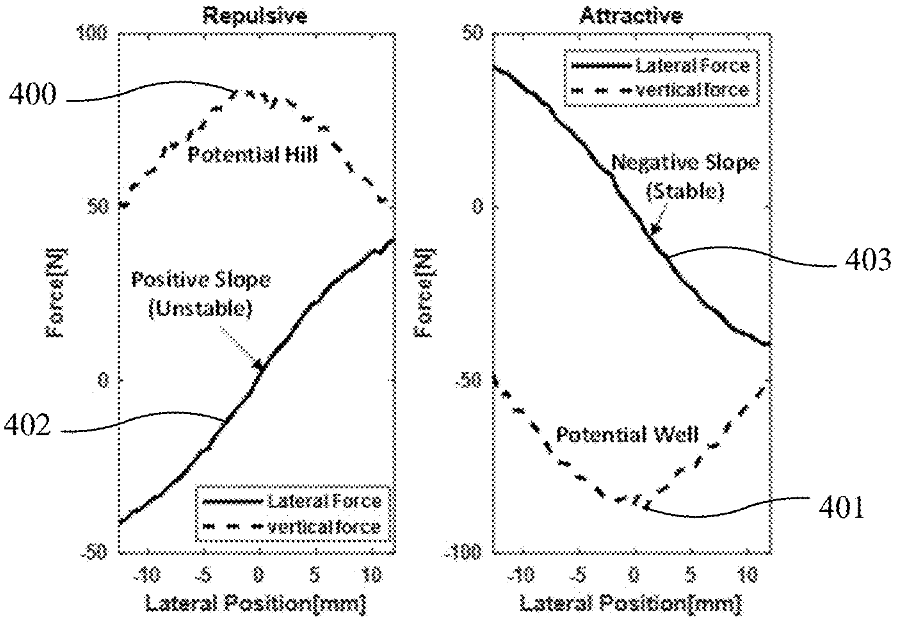
FIG. 3A is a graph illustrating magnetic forces generated by the interaction of the mover magnets and actuated magnets shown in FIGS. 2A, 2B and 2C, when the magnets are configured in a normally-repulsive orientation.
FIG. 3B is a graph illustrating forces generated by the interaction of the mover magnets and actuated magnets shown in FIGS. 2A, 2B and 2C, when the magnets are configured in a normally-attractive orientation.

FIGS. 3A and 3B show the result of the simulations. FIG. 3A shows the repulsive case, while FIG. 3B shows the attractive case. In the repulsive case of FIG. 3A, there is a potential hill 400 near the center 303 (FIG. 2B) of the actuated magnet distribution, whereas the attractive case of FIG. 3B has a potential well 401. The simulations also show that lateral forces are present as the mover is shifted away from the center of the sweep. In the repulsive case, the lateral forces 402 act to push the mover away from the center of the distribution, making the center position unstable. In other words, a mover centered on the repulsive hill will tend to get pushed to the side and off of the hill. By contrast, the lateral forces 403 in the attractive case act to push the mover back towards the center of the potential well and therefore the center of the well 401 is a stable position. These lateral forces create stability in the lateral directions while the false floor provides stability vertically. Similar to the restoring forces that keep a mover at the center of attractive well, the well also creates a restoring torque that prevents the mover from rotating inside the well.

Figures 10A, 10B, 10C:
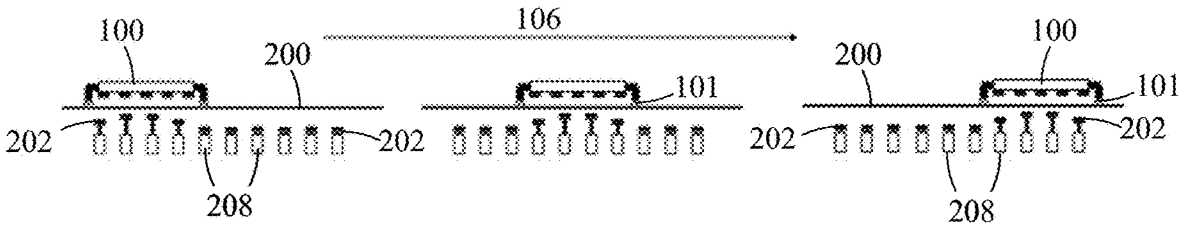
FIG. 10A is a side view of a mover in a first position, before it is being dragged to the right by lateral attractive forces between the mover magnets and actuated magnets set up in a normally-attractive orientation
FIG. 10B is a side view of the mover shown in FIG. 10A in a second position, having been dragged to the right over time from the first position shown in FIG. 10A.
FIG. 10C is a side view of the mover shown in FIGS. 10A and 10B in a third position, having been dragged further over time to the right from the second position shown in FIG. 10B.

FIGS. 10A, 10B and 10C are simple illustrations of how the under-floor unit cells 208 actuated magnets 202 can be raised and lowered to create a moving potential well that attracts and drags a mover 100 along the floor 200 (direction of travel indicated by arrow 106). Note that the actuated magnets 202 do not move laterally; each one only moves up and down, towards and away from the false floor 200. Groups of actuated magnets will raise and lower in precise locations and formations, based upon the target mover's area, shape, mass, center of gravity, current location, current velocity, desired interim and ultimate destination, desired path, and desired velocity to form a moving potential well.

A potential well can also be created by actuated ferrous material, which can interact with permanent magnets under a mover. For this method, some or all of the under-floor actuators have ferrous material mounted thereon, rather than permanent magnets. Magnetic interaction of the actuated ferrous material with the permanent magnets under the movers causes attractive forces which can pull or drag the mover along in the same way as actuated magnets in a normally-attractive orientation would do. Alternatively, movers can have ferrous material instead of permanent magnets, and the ferrous material can be pulled by the under-floor actuated magnets.

Attraction Using Normally-Repulsive Magnets

Figure 4:
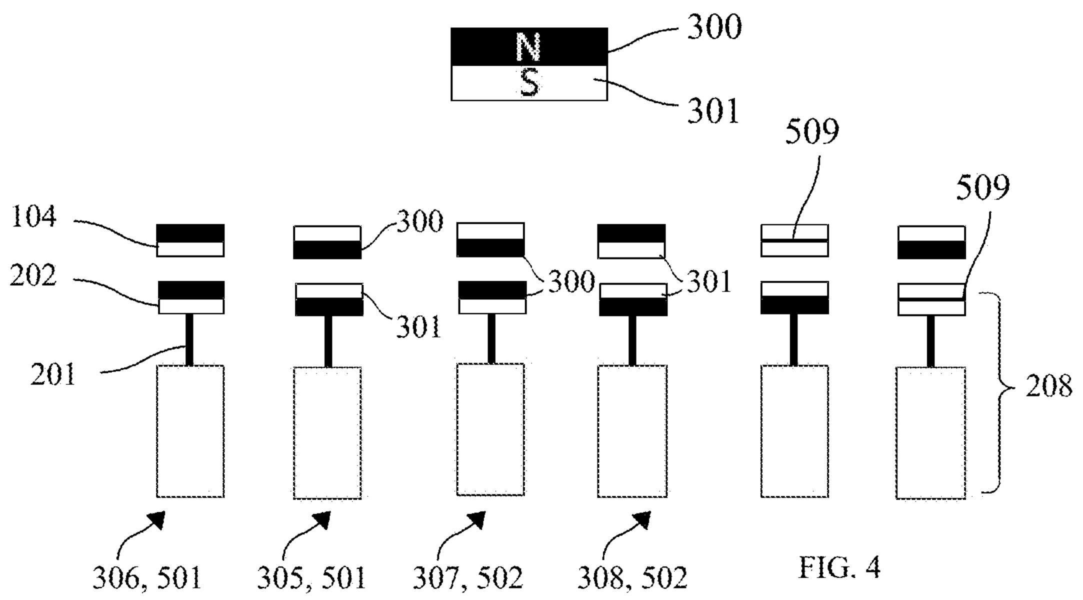
FIG. 4 is a side view of mover magnets and actuated magnets set up in a normally-attractive orientation and a normally-repulsive orientation. Ferrous material is also shown substituted for a mover magnet, or substituted for an actuated magnet.

The above analysis shows a method for creating attractive forces using opposite facing magnets in the mover and actuators. See FIG. 4. In other words, the polarity of the magnets 202 on the actuators 201 is aligned in the opposite direction as the magnets 104 on the mover. This orientation has, in the illustrated example, a North pole 300 on the mover facing a South pole 301 on the actuators 305 (or vice versa 306), and this is referred to herein as the normally-attractive orientation. Ferrous material 500 can replace either the mover magnets or the actuated magnet, as shown in FIG. 4. The remaining set of magnets exerts attractive magnetic force on the ferrous material in the same way that magnets in a normally-attractive orientation would, usually with less force.

Conversely, aspects herein can use an architecture where a North pole 300 in the actuators faces a North pole 300 in the mover 307 (or South facing South 308). This is referred to herein as the normally-repulsive orientation. The normally-attractive 501 and normally-repulsive 502 architectures, as well as attractive architectures using ferrous material 509 can be used in any combination, as illustrated in FIG. 4.

The normally-repulsive architecture is used for magnetic levitation, and it can also be used to create an attractive well between the mover and actuated magnets, similar to the normally-attractive case. To understand this effect, a simulation was created to explore the vertical force exerted by two magnets of the same type, size and strength separated by a fixed vertical gap with magnetizations oppositely polarized such that the two magnets repel when they are directly underneath each other (i.e. the normally-repulsive case).

Figure 5:
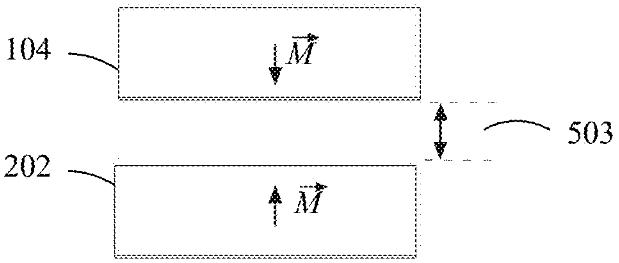
FIG. 5 is a side view of a mover magnet and an actuated (platform) magnet set up in a normally-repulsive configuration, to illustrate the simulation whose data is shown in FIG. 6.
Figure 6:
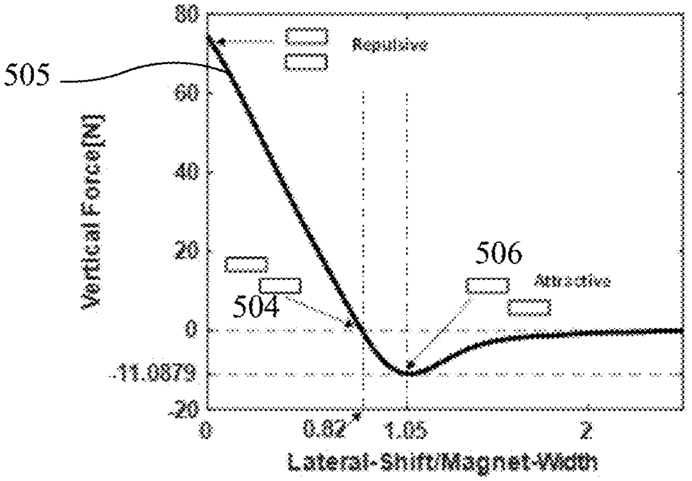
FIG. 6 is a graph illustrating vertical force generated between the two magnets of FIG. 5, as the position of the platform magnet in relation to the levitated magnet moves laterally from center to the right.

In the simulation the vertical gap 503 between magnets was kept fixed as shown in FIG. 5, and varied the lateral position of the top magnet 104 relative to the bottom magnet 202. The simulated results for the vertical force on the top magnet 104 as a function of lateral displacement is shown in FIG. 6.

The simulations show that vertical forces can switch between repulsive and attractive. For instance, for the simulated system, the simulations show that when the magnets are laterally displaced, e.g., more than about 82% of the width of the magnet (illustrated at position 504) in this example, the vertical force 505 on the levitated magnet 104 switches from repulsive to attractive. The simulations also show that significant lateral forces are present when the two magnets are displaced laterally (illustrated at position 506).

Figure 7:
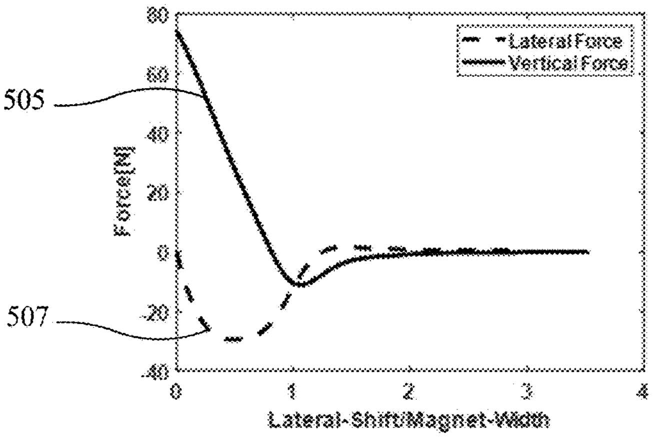
FIG. 7 is a graph illustrating both lateral and vertical force generated between the two magnets of FIG. 5, as the position of the platform magnet in relation to the levitated magnet moves laterally from center to the right.

FIG. 7 is a plot of the simulated forces in both the vertical 505 and lateral 507 directions as the two magnets are displaced laterally.

These simulations further show that a system with a normally-repulsive architecture can create a net attractive vertical force on a mover using magnets that are aligned in the normally-repulsive configurations, and that significant lateral forces can also be obtained. To demonstrate this at the system level, a constrained optimization was performed on a system consisting of an array 206 of actuated permanent magnets 202 and a mover 100 situated above the actuated magnets. The magnets in the simulations are configured in the normally-repulsive orientations. An optimization was performed to find the vertical actuations needed to provide a net attractive vertical force (an attractive well) on the mover 100 and no lateral forces.

Figure 8A:
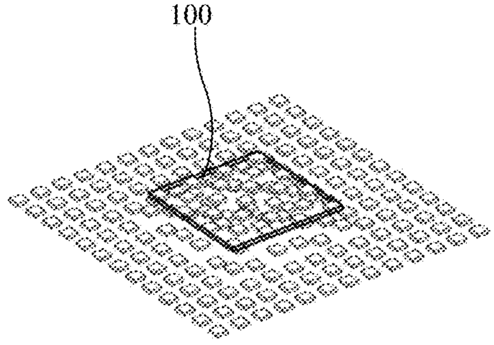
FIG. 8A shows an isometric view from the side and top, as well as a side view from the left, of a mover (wheels not shown) being held in a stable position by actuated platform magnets in an exemplary optimized configuration using normally-attractive orientation.
Figure 8B:
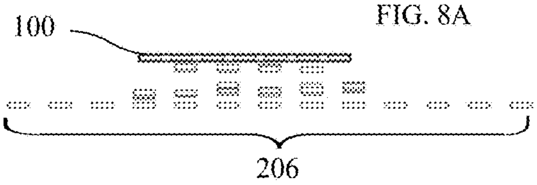
FIG. 8B shows a top view, as well as a side view from the right, of a mover (wheels not shown) being held in a stable position by actuated platform magnets in an exemplary optimized configuration using normally-attractive orientation.
Figure 8B:
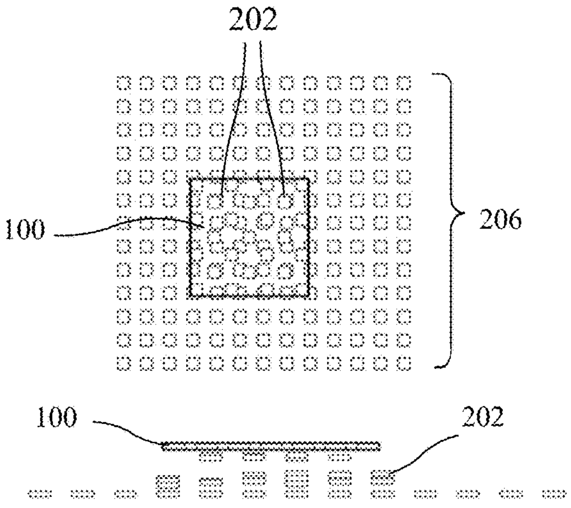

The simulation geometry and optimized actuations are shown in FIGS. 8A and 8B. FIGS. 8A and 8B show the position of the mover 100 and the optimized actuation positions of the platform magnets 202 that give a net attractive force in the Z direction and zero lateral forces.

A separate simulation was then performed with specific parameters, such as mover size (10 inch square), magnet strength (N52 grade), magnet size (one inch square by 0.25 inch depth), and magnet spacing (modified checkerboard pattern with 3 inch X and Y distance between centers of magnets on mover, and simple grid with 2 inch X and Y distance between centers of magnets on platform), in which these optimized actuations were fixed in place and the mover was displaced laterally from the center of the attractive well created by the actuated magnets.

Figure 9:
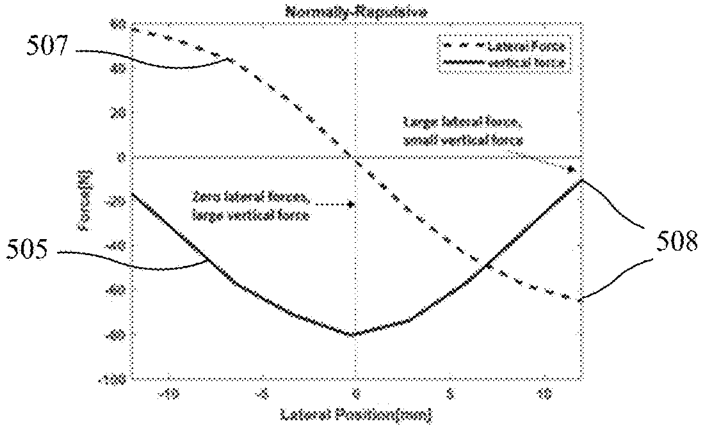
FIG. 9 is a graph illustrating both lateral and vertical forces generated between mover magnets and actuated magnets set up in a normally-repulsive orientation, as their relative lateral positions change.

The simulation results are shown in FIG. 9. Similar to the normally-attractive architecture, the results show that even in this normally-repulsive orientation, an attractive well is created between the mover and the actuated magnets. These results suggested an appealing control strategy. As the mover is displaced from the center of the well, the vertical force 505 decreases while the restoring lateral force 507 increases. In this particular case, when the center of the mover reaches a predetermined position, e.g., when the mover is approximately 15 mm from the center of the well (see position 508) in this example, the net vertical force is close to zero while the lateral restoring force is greater than 70 Newtons.

A propulsion strategy in which the actuated magnets are moved to set points which create a well that is always in front (e.g., around 10 mm in front in an illustrative example) of a wheeled mover, creates a strong constant lateral force for propulsion, and diminishes the detrimental impacts of increased friction due to the attractive vertical force in the well. When not in motion, the magnetic interactions can serve as a parking brake—by positioning the wheeled mover at the location where lateral forces are minimized while negative Z forces are maximized, the wheeled mover is kept locked in place.

Aspects herein provide that the normally-repulsive architecture can be operated in at least three different modes of magnetic motion:

Full Levitation—In this case, full levitation of the mover can be achieved using active feedback and a control loop without the use of wheels or other friction-reducing means between the mover and the floor. The mover is both levitated and propelled using magnetic forces. The control loop can be PID (proportional-integral-derivative), or MPC (model predictive control), or another type.

Wheeled repulsive—In this case, the system consists of a mover(s) on a false floor, usually with some means of reducing friction between the mover's bottom surface and the floor's top surface, like wheels, casters, grease or soap, and repulsive magnetic forces are used to push the mover across the false floor. The false floor provides vertical support, stability and balance while magnetic forces are used to push the mover laterally using a much less stringent control loop.

Wheeled attractive—In this case, the system consists of a mover on a false floor, and stable attractive magnetic forces are used to drag the mover across the false floor. The false floor provides vertical support and balance while magnetic forces are used to pull the mover across the false floor without as much need to use a PID (or similar) control loop.

A mobility strategy is described herein using attractive net force between a set of actuated magnets and a wheeled mover. The key difference between this attractive architecture and a repulsive architecture in a mobility application is that a wheeled mover being pushed with repulsive forces is unstable to external disturbances, and requires some amount of active feedback to keep the mover in a stable lateral location; while the attractive arrangement naturally pulls the mover to a stable lateral location, and does not require any (or minimal) active feedback. In the case of repulsive levitation, the active feedback requirements become more demanding, requiring a faster response feedback loop.

In an active feedback scheme, the position of the mover is monitored using a set of sensors, such as optical cameras, IR cameras, LIDAR, RADAR, pressure sensors, ultrasonic sensors, microphones, capacitive or inductive sensors, depth sensors, Hall effect sensors or color sensitive photodiodes. When the position of the mover deviates from a target set point, within a repulsive architecture, restoring forces are applied to nudge the mover back to the set point. These restoring forces can be accomplished, for example, through actuating permanent magnets or through using electromagnetic coils which may be integrated into the false floor. A control loop can be implemented to run the position detection and restoring force application in a loop. A Proportional-Integral-Derivative (PID) control loop is a classical way to control such a system.

By contrast (as described above), the lateral forces in the attractive system makes the system stable to lateral movements. In a mobility application using an attractive well, the vertical positions of the actuated magnets are adjusted to move the potential well laterally. Since the mover is attracted to the center of the well, the actuated magnets can be used to drag the wheeled mover across the false floor in a controlled manner. This is illustrated in FIGS. 10A, 10B and 10C.

In an attractive system with normally-attractive oriented magnets, a wheeled mover can easily be kept stably stationary in one place, over a potential well, with no control loop needed. Using normally-repulsive oriented magnets, a potential well can similarly be created to attract and hold a wheeled mover over the location of the potential well, keeping it stationary with a minimal control loop.

Figures 11A, 11B:
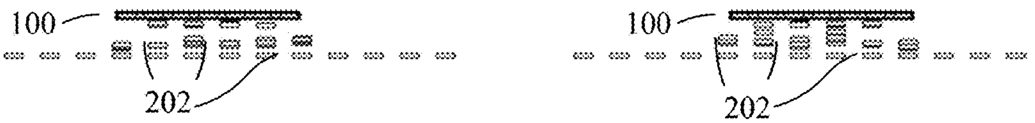
FIG. 11A is a first side view of a mover in a first position, being attracted by actuated platform magnets set up in a first exemplary optimized configuration using normally-attractive orientation.
FIG. 11B is a second side view of the mover of FIG. 11A at a slightly later time, having been dragged slightly to the right by actuated platform magnets which have adjusted their exemplary optimized configurations and actuated positions, still using normally-attractive orientation.
Figures 12A, 12B, 12C:
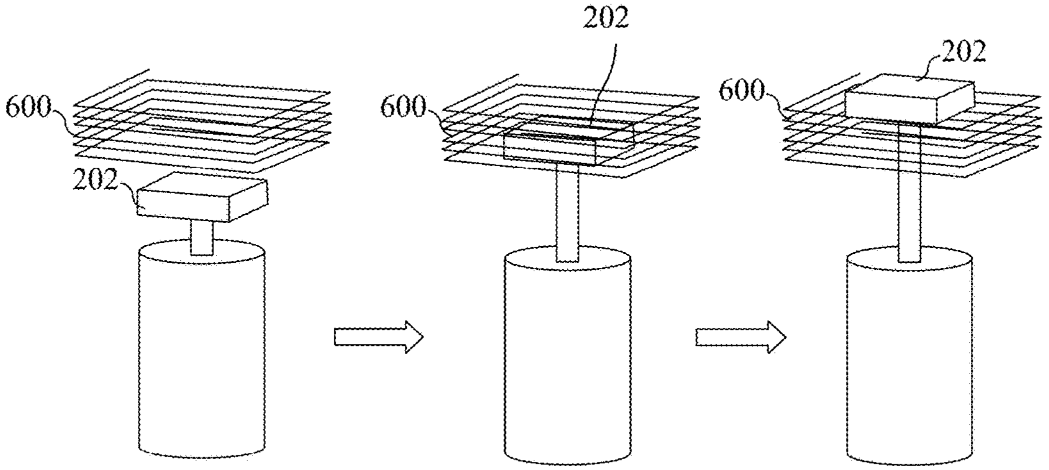
FIG. 12A is a side view of a unit cell, comprising a permanent magnet mounted on a linear actuator, combined with an electromagnetic coil, where the permanent magnet is retracted below the coil.
FIG. 12B is a side view of the unit cell of FIG. 12A, showing the permanent magnet actuated up to a position inside of and level with the coil.
FIG. 12C is a side view of the unit cell of FIGS. 12A and 12B, showing the permanent magnet further actuated up to a position above the coil.
Figure 13:
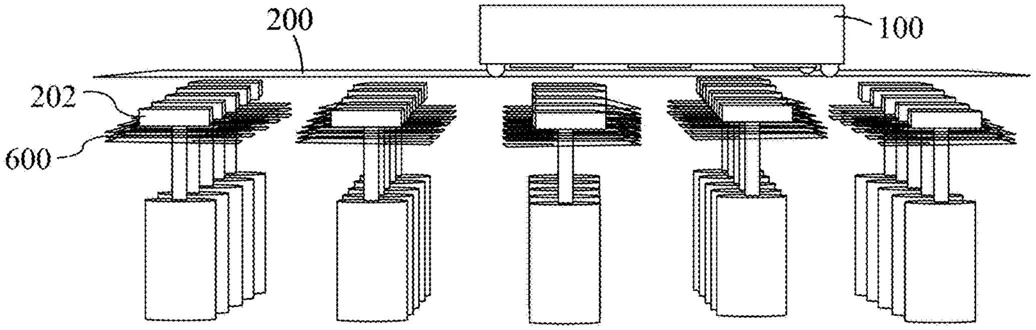
FIG. 13 is a side view of an array of permanent magnets mounted on linear actuators and combined with electromagnets, underneath a floor, with a mover above the floor.

In an exemplary implementation, numerical modeling is used to find the optimal positions of the actuated magnets as a function of mover position. FIGS. 11A and 11B show two example optimized actuated magnet positions for two different mover positions. As the actuated magnets 202 are adjusted, the mover 100 will be dragged along a desired path across the false floor, for example from an initial position shown in FIG. 11A to a second position slightly to the right, shown in FIG. 11B. For this approach, it is not necessary to adjust actuated magnet positions to apply restoring forces. Instead, actuated magnet positions are adjusted to generate the path which the mover will follow. The system still must ascertain the position of the mover, for example using sensors as described previously, so that the potential well is always formed at the right position and at the right time to control the path of the mover.

Figure 26A:
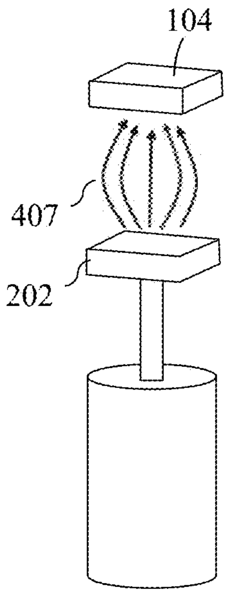
FIG. 26A is a schematic side view of attractive magnetic force resulting from an actuated permanent magnet interacting with a mover magnet.
Figure 26B:
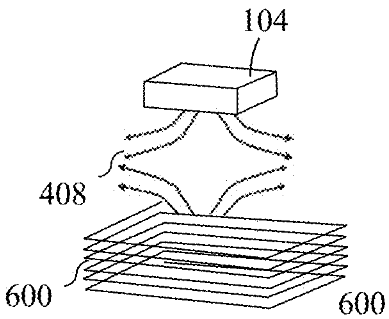
FIG. 26B is a schematic side view of repulsive magnetic force resulting from an electromagnetic coil interacting with the mover magnet shown in FIG. 26A.
Figure 26C:
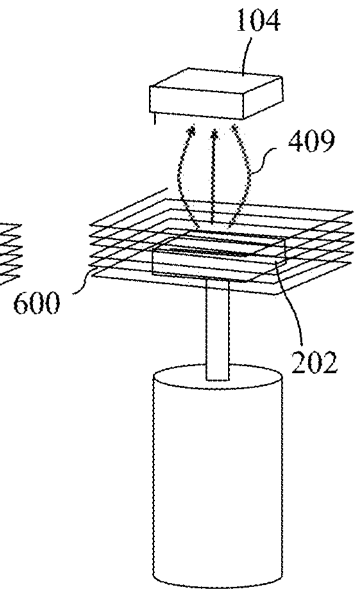
FIG. 26C is a schematic side view of combined and therefore reduced attractive magnetic force resulting from both the actuated permanent magnet of FIG. 26A and the electromagnetic coil of FIG. 26B acting on the mover magnet shown in both FIGS. 26A and 26B.

In other embodiments, electromagnets can also be incorporated into the attractive magnet mobility system. As examples, the electromagnets 600 can be embedded around actuated permanent magnets 202 as shown in FIGS. 12A, 12B, 12C and 13, or on PCBs 601 that sit on the floor 200, above the actuated permanent magnets 202, as shown in FIG. 14. In an attractive wheeled motion system, attractive forces between actuated magnets and mover magnets holding a mover in place can be very strong, requiring a strong effort to pull the actuated magnets away, to allow the mover to move again. Instead of having the actuators pull away with great force, Permanent electromagnets, electropermanent magnets or coil electromagnets can be instantaneously used to moderate, eliminate, or counteract the magnetic field of the actuated permanent magnets, partially or fully, to ease stress on the actuator structure as it withdraws the permanent magnet. This is illustrated in FIGS. 26A, 26B and 26C. FIG. 26A schematically shows a strong magnetic attraction 407 between an actuated magnet 202 and a mover magnet 104. FIG. 26B shows a repulsive force 408 between an electromagnetic coil 600 and the mover magnet 104. FIG. 26C shows the combined forces of the actuated magnet 202 and the electromagnetic coil 600, reducing the attractive forces 409. Electromagnets can generate temporary magnetic forces of the opposite polarity of the actuated permanent magnets, reducing the strength of the attractive magnetic field and allowing for fast decoupling of the actuated permanent magnets beneath the permanent magnets within the mover, and accelerating the transition to the next potential well. Once the actuated magnets have retracted, and the mover magnets have been decoupled from the actuated magnets, the electromagnets can turn off. Electromagnets can also be used as a safety feature, or release feature, generating temporary opposing magnetic forces to the actuated permanent magnets, thereby neutralizing actuated permanent magnet forces and allowing the removal of any magnetic or ferrous material debris which may have become coupled to the surface of the false floor. Permanent electromagnets and electropermanent magnets are able to switch their magnetic forces on and off, and thus can also be used for these purposes. In one embodiment, the actuated magnets are themselves composed of permanent electromagnets or electropermanent magnets, and can be switched on and off as desired.

In yet another embodiment, a bed of actuating permanent magnets, which may also include integrated arrays of electromagnets, generates magnetic forces to transport wheeled movers. Permanent magnets are also attached to the underside of the wheeled mover. The polarity of the magnets on the mover can be oriented such that there can be both attractive and repulsive forces generated between the actuated magnets under the false floor and the magnets on the mover. In other words, the polarity of the permanent magnets on the mover may be both North and South, and therefore generate both attractive and repulsive forces with the homogenous polarity of the actuated permanent magnets.

In such a system, a mover with attractive permanent magnets along two opposite edge rows (FIG. 15A) 701, and repulsive magnets along its inner or center rows 702, including the edges, can generate repulsive forces to push the mover in a desired direction, while providing stability to the wheeled mover by generating attractive forces along its side edges. Alternatively, using the same configuration shown in FIG. 15A, the center rows 702 of permanent magnets can generate a potential well, allowing the mover to be pulled forward, while repulsive magnets along the two outer edges 701 help to provide greater lateral force or alternatively, may reduce the effective load of the mover on the false floor, thereby resulting in faster, more responsive motion, and less wear on the casters/wheels and on the false floor.

Similarly, as shown in FIG. 15B, permanent magnets on the mover can be oriented such that the magnets on the front portion 703 of the mover have one polarity producing a net attraction with actuated magnets below, and the magnets on the back portion 704 of the mover produce a net repulsive force with actuated magnets below or vice versa. The forces imparted on the wheeled mover depend on the positions (heights) of the actuated permanent magnets beneath the false floor.

Alternatively, as shown in FIG. 16, a mover with magnets oriented for repulsive forces 705 can be connected with a mover oriented for attractive forces 706, and the load may be placed on one or the other, or both. Generally, multiple wheeled movers can be interconnected physically or operationally, thereby increasing the maximum load and the size of the load that can be carried by the combined movers. The motions of each of the wheeled movers are coordinated by the actuated permanent magnet system, allowing for multiple wheeled movers to act as a single larger mover. Permanent magnets are attached to the underside of each mover, and the configurations and polarities of the permanent magnets of each mover can be the same, or different, or have any number of combinations.

A mover with magnet configuration including sets of magnets with opposite polarities, for example similar to that shown in FIG. 15A, can be propelled using any of at least three separate control mechanisms. This mover has multiple permanent magnets mounted on its underside, including two sets of magnets with normally-repulsive orientation on opposite edges 701, and the center magnets 702 being in a normally-attractive configuration as to the actuated magnets below. The three separate control mechanisms are: 1) Arrays of actuated magnets located under the outer edges of the mover can lift up to interact with the mover edge magnets in repulsive orientation 701, thus providing repulsive forces pushing the mover forward. 2) Arrays of actuated magnets directly underneath or slightly in front of the normally-attractive mover magnets 702 can lift up to provide attractive forces to pull the mover along. 3) A combination of both propulsion strategies (1) and (2) can be implemented simultaneously.

3) Arrays of actuated magnets directly underneath or in front of the mover can lift up to provide attractive forces (creating a well) to the normally-repulsive mover magnets on the mover's front end, pulling the mover forward. This is simply one example of a configuration of mover magnets with varied magnetic orientations that can be propelled by the under-floor actuated magnets.

Figure 23:
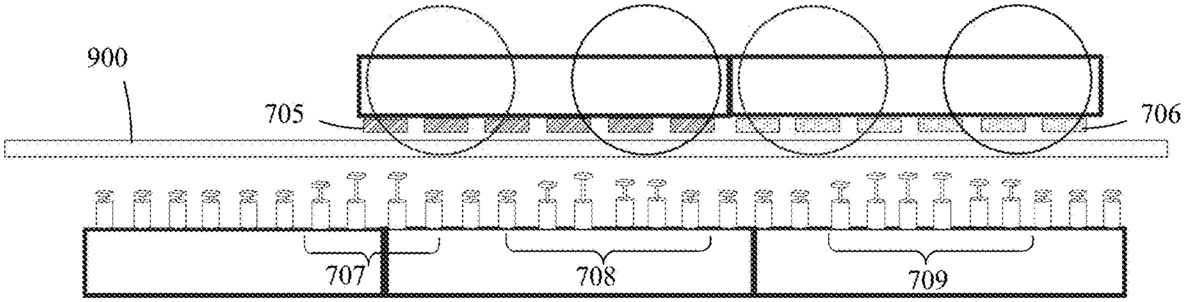
FIG. 23 is a side view of a combined wheeled mover with magnet configuration shown in FIG. 16, with repulsive magnets on the left side and attractive magnets on the right, on rails as shown in FIG. 20, and three modular platforms below the rails. The unit cells are actuated in a way to propel the mover to the right using three separate methods at the same time.

FIG. 23 is a schematic drawing showing a combined mover like that shown in FIG. 16 being pushed to the right using one method and pulled to the right using two separate methods. All of the unit cell permanent magnets are in a normally-repulsive orientation with the mover magnets 705 on the left side of the mover, and in a normally-attractive orientation with respect to the mover magnets 706 on the right side of the mover. The unit cells labeled 707 are providing repulsive force to the mover, pushing it to the right. The unit cells labeled 708 are forming an attractive potential well for the left side mover magnets in normally-repulsive orientation, and the unit cells labeled 709 are forming an attractive potential well for the right side mover magnets in normally-attractive orientation. By lowering and raising unit cells so that the patterns shown in 707, 708 and 709 are recreated incrementally to the right, the unit cells will push and drag the mover to the right using all three mechanisms.

In preferred embodiments, wheels or casters or ball bearings are constructed of non-magnetic, nonferrous materials. Alternatively, the false floor can be made slippery or low friction, such as with water, or ice, or soap, or grease, so that a mover can glide across the floor without needing wheels. In this disclosure, when a wheeled mover or a mover on wheels is mentioned, any of these configurations, or other methods of reducing friction between a mover and the floor, can be substituted.

Figure 17:
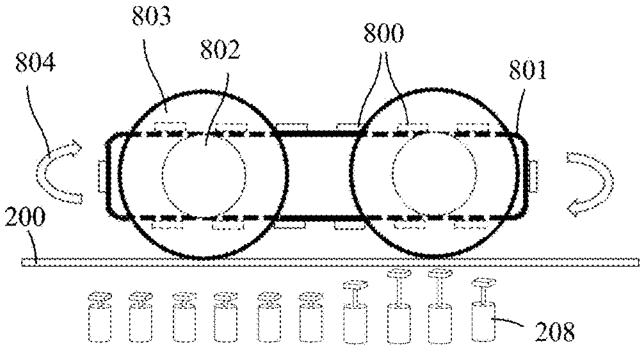
FIG. 17 is a side view of a mover with magnets mounted on a belt, which moves the wheels.
Figure 18:
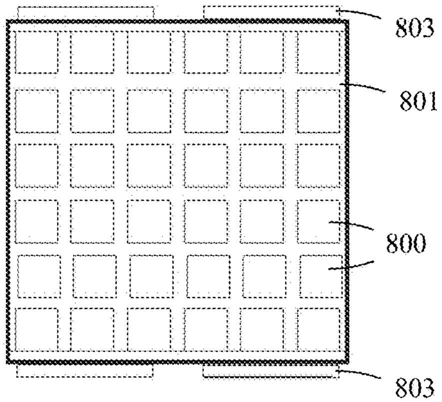
FIG. 18 is a bottom view of the mover shown in FIG. 17.

In another embodiment shown in FIGS. 17 and 18, permanent magnets 800 are attached to a belt 801, which makes intimate contact with one or more axles 802 through a mechanism such as gears (not shown). The axles 802 are attached to wheels 803 which engage with the floor 200 by means of friction. The actuated magnet system, using either attractive or repulsive forces, pulls or pushes the magnets on the part of the belt near the floor in a first direction 804, causing the belt 801 to turn, thereby driving the axle 802 and wheels 803. Various gear arrangements can be used to direct the rotation of the wheels in relation to the rotation of the belt (gears not shown). The belt may turn counter to the direction shown in FIG. 17, and through a 2 gear driver-follower configuration as one example, cause the wheels to turn in the opposite direction to the belt's direction of travel.

In an alternative embodiment, magnets can be directly attached or embedded within the wheels, and forces from actuating permanent magnets cause the wheels to directly turn. A non-rotating structure, such as the frame or body of a car is connected to the axles as through bearings, or to a non-rotating frame that supports and is in contact with the rotating belts again through a bearing interface. The non rotating frame or body allows loads to be transported.

Figure 19:
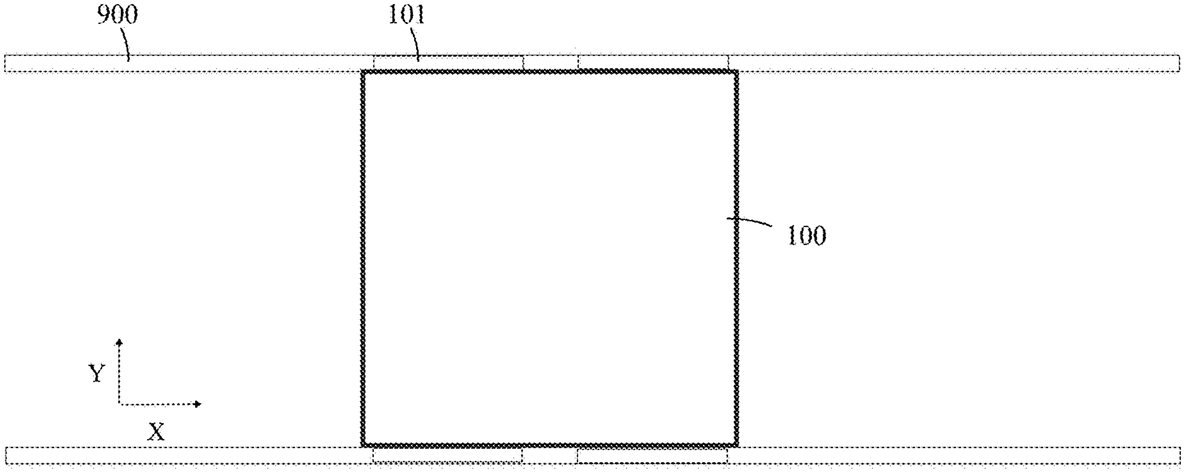
FIG. 19 is a top view of a mover with permanent magnets affixed to its bottom, mounted on rails.
Figure 20:
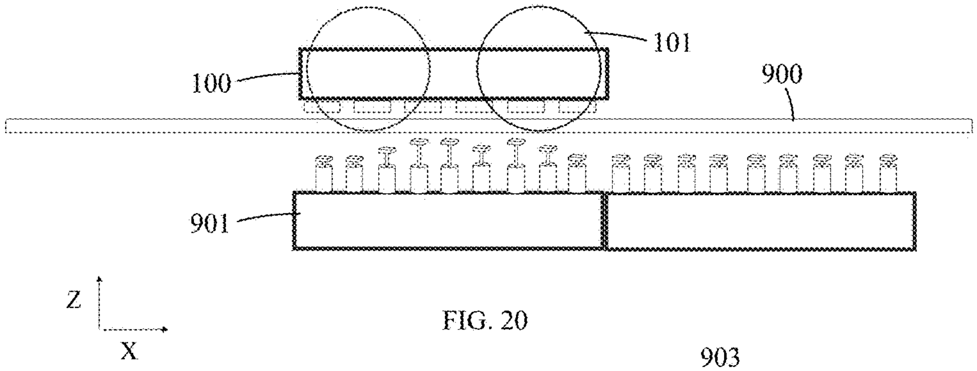
FIG. 20 is a side view of the mover shown in FIG. 19, with modular platforms with unit cells shown underneath.

In a railed embodiment shown in FIGS. 19 and 20, the movers 100 have support structures 101 that rest and travel on a railing system (rails or tracks) 900 instead of a full false floor, see FIG. 19, and the repulsive or attractive forces of the actuated permanent magnets 202 mounted on modular platforms 901 positioned beneath the wheeled movers 100 along the path of the rails 900, see FIG. 20, can be used to push (repulsive forces) or pull (attractive forces) the wheeled mover along the track/rails 900. Appropriate platforms 901 can individually be the same size, longer, shorter, wider or narrower than each wheeled mover 100.

Figure 21:
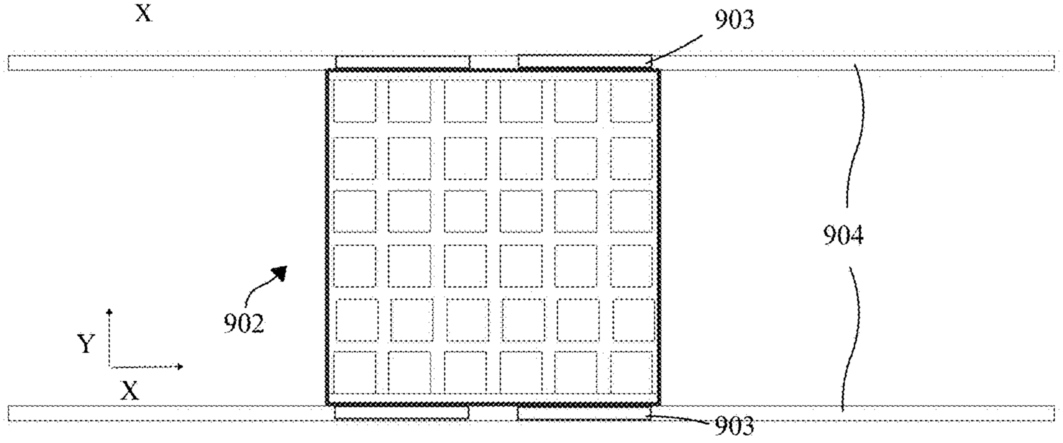
FIG. 21 is a top view of a platform with wheels, mounted on rails.
Figure 22:
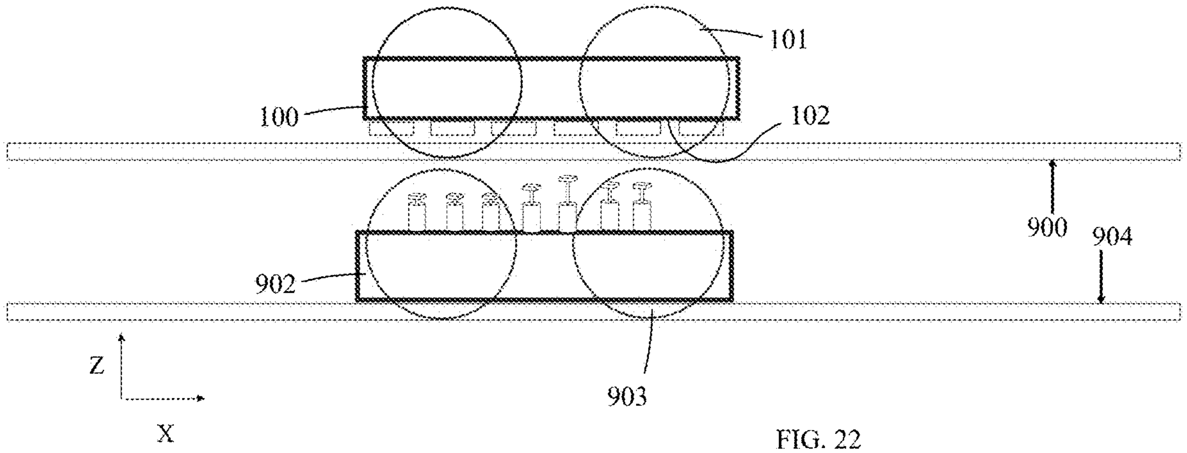
FIG. 22 is a side view of the mover shown in FIG. 19, with the wheeled platform shown in FIG. 21, and both sets of rails.

In another railed embodiment shown in FIGS. 21 and 22, the platforms 902 situated beneath the wheeled movers 100 have wheels 903 themselves, and can also rest and travel on a railing system 904 that is parallel to, but below, the mover railing system 900. The wheeled platform 902, traveling along its railing system 904, positions itself beneath a wheeled mover 100, and causes itself to become stationary, and performs appropriate actuations to cause repulsive or attractive forces that push or pull the mover 100 along its railed path 900.

Alternatively, a platform 902 places itself underneath a mover 100, actuates its magnets to create a potential attractive well that "grabs" the mover, then powers itself (the platform 902) to travel along its rails 904, dragging the mover 100 along with it, overhead on the mover rails 900.

Described herein are details of methods and systems of using the Attractive Magnetic Mobility System to transport movers. Numerical simulations are used to find the optimal positions of the actuated magnets and/or coil currents as a function of position in the XY plane. These pre-computed actuations and/or currents can be stored in a lookup table. For a given position in the XY plane where an attractive well should be formed, each actuator has a prescribed position and each coil has a prescribed current which can be retrieved from this lookup table. The current actual mover position is determined using data from distributed sensors embedded in the system. See exemplary sensors 405 embedded into the floor 209 as part of a magnetic movement system module 901 in FIG. 25. There are various methods for determining the mover position from the sensor data. For example, a color pattern can be attached to the underside of the mover and upward facing RGB sensors distributed throughout the top surface of the platform area as described in U.S. patent application Ser. No. 18/425,978. A neural network can then be trained to quickly and accurately predict the mover position based on the colors that are detected.

The required actuator locations/currents to create a strong restoring force and restoring torque (an attractive well) at every XY location within the configuration space are pre-computed and stored within a lookup table. The required actuator locations/currents for each location are dependent on the platform magnet dimensions and strength and positions, and target mover's area, its number of magnets, the magnets' dimensions and strength, the magnets' positions and other factors. For a specific mover with a size of 10.5 inches by 10.5 inches and with 25 1 inch square magnets spaced in a checkerboard pattern across the bottom of the mover, FIG. 9 shows the lateral and vertical forces experienced by the mover as it is shifted away from an attractive well. At a mover displacement of between 10 and 15 mm from the position the attractive well is formed, the lateral force curve peaks and flattens and the vertical force curve approaches zero and flattens. Therefore, (1) selecting a target location for a mover of this design that is between 10 and 15 mm away from its current location and (2) creating a potential attractive well at this target location will effectively attract the wheeled mover to the potential well.

This process and strategy to execute movement of a wheeled mover on an actuated magnet platform system can be generalized by (1) generating a table of actuator positions/current values that will create an attractive well at every location within the configuration space's XY plane for a specific mover and actuated magnet platform system; (2) generating a chart such as that shown in FIG. 9 for that specific mover and actuated magnet platform system; (3) identifying the flat region of the peak lateral force curve and the flat region of the near zero vertical force curve; (4) using this generally flat region to determine an intermediate travel distance from a mover's current location to an intermediate location; (5) selecting an intermediate target location for a mover on its path to the ultimate target location that is an intermediate travel distance away from the mover's current location; (6) creating an attractive well at this intermediate target location; and (7) then upon the mover arriving at or nearing its intermediate target location, repeating steps 5 through 7 until the mover has reached its ultimate target location.

The method of using a precomputed table that represents the actuation positions and optionally coil currents used to create an attractive potential well at every point (or a grid of points) across the XY plane of the configuration space is computationally simple, and requires very little real-time processing, as the values must only be retrieved. In one embodiment, the table represents a grid of points at 1/2 mm increments in the XY plane. The well is also calculated at 1 degree $\theta_z$ increments for each XY location. However, other methods of determining the actuation positions and coil currents exist.

Another approach to create an attractive well is to train a neural net to output desired values for the formation of an attractive well at a target destination. In this approach, neural nets are trained on a series of mover positions, target destinations across the XY plane of the configuration space, actuator positions and/or coil currents, and the corresponding forces generated by those actuator positions and/or coil currents on the mover (as determined through physical simulations). The neural net's objective function is to maximize the vertical force values at each point, while minimizing horizontal forces at that same point. Then, in real time, the control system chooses a target intermediate destination for the mover along the path towards its ultimate destination, and provides the intermediate destination to the neural net as input. The neural net then outputs the desired actuations and/or coil currents to create an attractive potential well at the intermediate destination.

In yet another approach, building on the prior approach, the neural net is trained in much the same way, except that additional training data includes the current actuator positions. The neural net then includes as part of its objective function minimizing the cumulative distances traveled by the actuators as they transition from their current state to the positions required to create an attractive potential well at each intermediate target destination. Then, when operating in real time, inputs to the neural net include additionally the current actuator positions. The neural net then outputs a set of actuations and/or coil currents to create an attractive potential well at the intermediate destination that minimizes changes in actuator positions. The tradeoffs between the strength of the attractive potential well and the minimized actuator motions will depend on the objective function weights.

Other such real-time methods to determine actuator positions exist, and the above are meant to illustrate the breadth of possible approaches.

Figure 24:
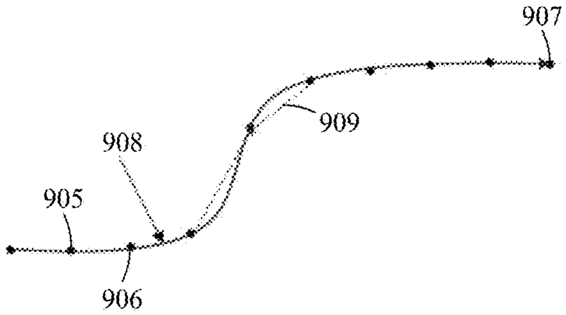
FIG. 24 shows a top view of an example path with interim waypoints marked.

To transport a mover through a prescribed path, one method is to use a series of waypoints. Waypoints are intermediate points that lie on the desired path as shown in FIG. 24. In this method, the control system is initially set with the first waypoint 905 as the target position. The control system applies magnetic forces to move the mover to this target position. These magnetic forces are created either through actuations of permanent magnets or varying the electrical currents in the electromagnetic coils or a combination of both. Once the mover is correctly positioned at the first waypoint 905 or is very near the waypoint, the target position is set to the second waypoint 906. This process continues with the target position for the mover being sequentially stepped through each waypoint until the mover is at the end point 907 of the path. In this method the mover will follow straight line trajectories 909 from one waypoint to the next. The accuracy with which the straight line motion matches the desired path depends on the number of waypoints with a larger number of waypoints more accurately representing the desired path 908. The velocity of the mover is controlled by the forces applied by the control system at each waypoint, and the time interval in which the control switches from one waypoint to the next.

We claim:

1. A system comprising:

a work surface having a configuration space associated therewith;

a configuration space unit having a conveyance system and at least one of a permanent magnet or a mass of ferrous material on a bottom of the configuration space unit, the configuration space unit positionable within the associated configuration space of the work surface; and a magnetic movement system having unit cells arranged in cooperation with the work surface, each unit cell comprising at least one of an actuator, an electromagnetic coil and a permanent electromagnet;

wherein the actuator is coupled to one of a permanent magnet or a mass of ferrous material, such that the actuator causes movement of the permanent magnet or mass of ferrous material towards or away from the work surface;

wherein the magnetic movement system is configured such that a magnetic force produced by an interaction between at least one unit cell and the configuration space unit performs at least one attractive operation that affects a position of the configuration space unit within the configuration space of the work surface.

2. The system of claim 1 wherein the configuration space unit further comprises an electromagnet or permanent electromagnet configured to moderate a magnetic field of the configuration space unit's permanent magnet.

3. The system of claim 1 wherein the work surface comprises rails and the configuration space unit's conveyance system is configured to travel on and rest on said work surface rails.

4. The system of claim 3 wherein:

the magnetic movement system further comprises rails located underneath the work surface rails; and wherein unit cells further comprise a conveyance system which is configured to travel on and rest on said magnetic movement system rails.

5. The system of claim 1 wherein the configuration space unit magnet comprises an array of a plurality of permanent magnets or an array of a plurality of masses of ferrous material, wherein at least one permanent magnet is configured to have an opposite polarity to at least one other permanent magnet.

6. The system of claim 5 wherein the bottom of the configuration space unit comprises a first area and a second area, and wherein the polarity of permanent magnets located in the first area is opposite to the polarity of permanent magnets located in the second area.

7. The system of claim 5 wherein the bottom of the configuration space unit comprises a first edge row, a second edge row located on an opposite edge to the first edge row, and a mid area, and wherein the polarity of permanent magnets located in the first edge row and second edge row is opposite to the polarity of permanent magnets located in the mid area.

8. The system of claim 1 wherein the magnetic movement system comprises one or more modules, each module comprising a finite plurality of unit cells.

9. The system of claim 8 wherein each magnetic movement system module is configured to operatively connect with additional magnetic movement system modules in cooperation with the work surface.

10. The system of claim 1 wherein the configuration space unit further comprises:

a closed loop belt with magnets or ferrous material affixed to an outer surface of the belt; and a conveyance system which comprises wheels and axles and is configured to be driven by the rotating belt;

wherein the belt is configured to be rotated by magnetic forces resulting from interactions between belt magnets and unit cells.

11. A method of magnetic transport using the system of claim 1, wherein the system further comprises a controller and a means for determining one or more of actuator positions and electromagnetic coil currents to create an attractive potential well;

the method comprising the steps of:

choosing a target location for a configuration space unit in reference to the magnetic movement system;

using the means for determining actuations and/or currents to determine actuation or current data for creating an attractive potential well at the target location; and applying said data using the controller to unit cells in the magnetic movement system, thus creating an attractive potential well at the target location, and thus attracting the configuration space unit and causing the configuration space unit to move towards the target location.

12. The method of magnetic transport of claim 11, wherein the means for determining actuator positions and/or electromagnetic coil currents comprises a memory with a table of actuator positions and/or electromagnetic coil currents optimized for a size, strength and arrangement of magnets being used in the system; and wherein the "using the means" step comprises finding a set of data in the memory table corresponding to the target location.

13. The method of claim 11, wherein the target location is an ordered set of one or more intermediate target locations with the last item in the set being an ultimate target location, and wherein the steps of claim 11 are repeated using each subsequent intermediate target location until the configuration space unit reaches the ultimate target location.

14. A method of magnetic transport using the system of claim 1, comprising the steps of:

choosing a configuration space unit and a target location;

ascertaining a current location of the configuration space unit;

identifying one or more unit cells which are located beneath the configuration space unit's current location and between the chosen configuration space unit's current location and the target location;

using the identified unit cells to exert an attractive magnetic force on the configuration space unit; and repeating the ascertaining, identifying and using steps until the configuration space unit's current location is equivalent to the target location.

15. A method of magnetic transport using the system of claim 1, comprising the steps of:

choosing a configuration space unit and a target location, wherein the configuration space unit has a center point;

ascertaining a current location of the configuration space unit's center point; and a direction between the current location and the target location; and a current footprint of the configuration space unit;

selecting an intermediate location which is in the direction and between the current location and the target location;

determining the identity of one or more unit cells which are located at one or more of the configuration space unit's current location footprint, the intermediate location's footprint, and the configuration space unit's footprint at any location in the direction and between the current location/footprint and the intermediate location;

using the identified unit cells to create an attractive potential well that exerts an attractive magnetic force on the configuration space unit, thus moving the configuration space unit towards the intermediate location; and repeating the ascertaining, selecting, determining and using steps until the configuration space unit's current location is equivalent to the target location.

16. A method of magnetic transport using the system of claim 4, wherein the system further comprises a controller and a means for determining one or more of actuator positions and electromagnetic coil currents to create an attractive potential well;

the method comprising the steps of:

choosing a configuration space unit on the work surface rails and a target location;

positioning a modular platform of unit cells on the magnetic movement system rails underneath the configuration space unit;

using the means for determining actuations or currents to determine actuation or current data for creating an attractive potential well at the modular platform's position;

applying said data using the controller to unit cells in the modular platform; and moving the modular platform along the magnetic movement system rails toward the target location, thus pulling the configuration space unit along on the work surface rails.

17. The method of claim 14, wherein the configuration space unit has a magnet with a downward-facing polarity and the identified unit cells have magnets with an upward-facing polarity; and wherein the configuration space unit magnet's downward-facing polarity is opposite to the upward-facing polarity of the identified unit cell magnets (a normally-attractive configuration).

18. The method of claim 14, wherein the configuration space unit has a magnet with a downward-facing polarity and the identified unit cells have magnets with an upward-facing polarity; and wherein the configuration space unit magnet's downward-facing polarity is the same as the upward-facing polarity of the identified unit cell magnets (a normally-repulsive configuration).

19. The method of claim 14, wherein one of the configuration space unit or the identified unit cells comprises masses of ferrous material instead of permanent magnets or electromagnetic coils.

20. A method of reducing attractive magnetic forces at the work surface of the system of claim 1 for the purpose of releasing a configuration space unit or ferrous material, wherein the magnetic movement system comprises at least one of an electromagnet, a permanent electromagnet or an electropermanent magnet, the method comprising the steps of:

retracting one or more unit cells from the work surface; and activating the electromagnet, permanent electromagnet or electropermanent magnet to moderate a magnetic force acting at the work surface.

21. A method of removing ferrous material from a configuration space unit of the system of claim 2, wherein the configuration space unit comprises at least one of an electromagnet, an electropermanent magnet or a permanent electromagnet;

the method comprising the steps of:

activating the electromagnet, electropermanent magnet or permanent electromagnet to moderate a magnetic force acting at the bottom of the configuration space unit; and removing ferrous material from the bottom of the configuration space unit.

22. The system of claim 1, wherein a unit cell further comprises an actuator coupled to a permanent electromagnet or an electropermanent magnet, such that the actuator causes movement of the permanent electromagnet or electropermanent magnet towards or away from the work surface.

23. The system of claim 1, wherein the configuration space unit further has a permanent electromagnet or electropermanent magnet on a bottom of the configuration space unit.

* * * * *